US006727449B2

(12) United States Patent
Spiegel et al.

(10) Patent No.: US 6,727,449 B2
(45) Date of Patent: Apr. 27, 2004

(54) SNAP-IN LOCKING DEVICE FOR A MULTISTAGE ROTARY SWITCH

(75) Inventors: Edgar Spiegel, Homburg (DE); Thomas Prowald, Dirmingen (DE); Martin Fickert, Herrstein (DE)

(73) Assignee: Whirlpool Corporation, Benton Harbor, MI (US)

(*) Notice: Subject to any disclaimer, the term of this patent is extended or adjusted under 35 U.S.C. 154(b) by 0 days.

(21) Appl. No.: 10/352,532

(22) Filed: Jan. 28, 2003

(65) Prior Publication Data

US 2003/0141175 A1 Jul. 31, 2003

(30) Foreign Application Priority Data

Jan. 30, 2002 (DE) ........................................ 102 03 509

(51) Int. Cl.[7] .......................... H01H 19/54; H01H 3/32; F16H 53/00

(52) U.S. Cl. ........................ 200/336; 74/567; 200/17 R

(58) Field of Search ......................... 200/6 R, 6 B–6 C, 200/61, 86, 11 G, 17 R, 18, 329–336, 6 A; 74/567–568 T

(56) References Cited

U.S. PATENT DOCUMENTS 2,970,199 A * 1/1961 Dull et al. .................. 200/569
3,198,893 A * 8/1965 Mapelsden .................. 200/6 B
4,175,220 A * 11/1979 Johnston et al. ............... 200/4
4,272,658 A * 6/1981 Crosby ....................... 200/6 B
5,594,220 A * 1/1997 Hackbarth et al. .......... 200/6 B

FOREIGN PATENT DOCUMENTS

DE 3115358 A1 * 11/1982 .......... H01H/19/54
DE 3140772 A1 * 4/1983 .......... H01H/19/54
DE 3740415 A1 * 6/1989 ............ H01H/3/50
DE 9419356 U1 * 4/1995 .......... H01H/19/54

* cited by examiner

*Primary Examiner*—James R. Scott
(74) *Attorney, Agent, or Firm*—John F. Colligan; Robert O. Rice; Stephen Krefman

(57) ABSTRACT

The invention relates to a snap-in locking device for a multistage rotary switch with a switch spindle that is connectable with a rotary knob. The switch spindle is connected with an axle part that is snapped into an inner receptacle of a built-in switch panel part. The axle part rests on the switch panel part and is lock-in adjustable between snap-in receptacles with cams that are each limited by two radially-aligned connector links. The snap-in receptacles cover the entire circumference of the inner receptacle of the switch panel part. The axle part can be set into rotary motion with the switch spindle by a rotary knob, which is attachable to the switch spindle, and that modifiable limit stops define the number of switch positions, then a snap-in locking device for a operating unit is created with simple and cost-effective production and assembly parts that is coupleable with other components of the operating unit and can be equipped with an over-rotation safeguard.

7 Claims, 2 Drawing Sheets

SNAP-IN LOCKING DEVICE FOR A MULTISTAGE ROTARY SWITCH

BACKGROUND OF THE INVENTION

1. Field of the Invention

The invention concerns a snap-in locking device for a multistage rotary switch with a switch spindle that is connectable with a rotary knob, by means of which a switch part is adjustable into several switch positions, wherein the switch positions are determined by the pre-defined snap-in positions of the snap-in locking device, which comprises a snap-in lock element and counter-snap-in elements.

2. Description of the Related Art

Rotary switches of different constructions are used in a variety of electric devices. Subsequently, the rotary switches may feature different switch positions that can be set by rotating the switch spindle in one or another direction. The number of switch positions may also vary and cover the entire angular range of 360° degrees or just a part thereof.

Rotary switches that are installed into a housing are frequently designed as a complete component, as disclosed in DE 94 19 356 U1, DE 31 40 772 C2 and DE 37 40 415 A1.

Rotary switchers are also being used more and more as operating units for household appliances for transferring control signals to a corresponding electronic device control. Consider program selection in washing machines, dishwashing machines or microwave appliances for a moment.

As disclosed in DE 31 15 358 C2 such operating units are constructed from several components, each of which fulfill separate sub-tasks. The snap-in locking device for such an operating unit, i.e. rotary switches, constitutes an essential component that requires considerable parts and labor expense, in particular in conjunction with the other components of the operating unit, like the rotary knob for adjusting the switch spindle, limit stops for setting the number of switch positions and the actual switch or control part.

The task of the invention is to create a snap-in locking device for a multistage rotary switch as a component of the type mentioned at the outset, that can be realized with little cost and labor expenditure, easily configured to a variety of switch positions and easily connected with the other components in an operating unit.

SUMMARY OF THE INVENTION

According to the invention this task is solved in that the switch spindle is connected with an axle part that is snapped into an inner receptacle of a built-in switch panel part, that the axle part rests on the switch panel part and is lock-in adjustable between snap-in receptacles with cams that are each limited by two radially-aligned connector links, that the snap-in receptacles extend around the entire circumference of the inner receptacle of the switch panel part, that the axle part can be set into rotary motion with the switch spindle by means of a rotary knob, which is attachable to the switch spindle, and that modifiable limit stops define the number of switch positions.

The switch spindle with the axle part is snapped directly into a switch panel part as is desirable in household appliances with program selectors. The switch panel part may be used as a counter-snap-in element for several program selectors. Preferably, the switch spindle forms a one-piece plastic-injection mould part with the axle part and can be mounted rotatable in the switch panel part without separate fastening parts. The connector links form snap-in receptacles into which cams as snap-in elements of the axle part are snapped.

The design of the switch spindle as a flexible shaft provides a tolerance offset to the rotary switch of a control unit, as well as seamless fit of the control unit into the switch panel and/or operating screen part. This type of decoupling the snap-in locking device to the control unit primarily enables a flexible and cost-efficient design of the operating unit without the snap-in mechanisms.

At the same time it can be a benefit that the front and back edges of the cams are beveled so that the switch spindle with the axle part can carry out the necessary axial positioning movements in the inner receptacle of the switch panel part from switch position to switch position without undoing the snap-in connections between the axle part and the switch panel part. The rotary knob is simply slipped on to the non-circular switch spindle and fastened. The snap-in locking device with switch spindle and axle part as well as rotary knob and switch panel part can be mounted easily and quickly without separate fastening parts. The non-circular switch spindle is easily coupleable with the other function parts of the operating unit via a flexible shaft that provides a tolerance offset.

One design for the snap-in connection between the axle part and the switch panel part provides that the axle part features a collar that is segmented into snap-in tabs with catch stops on the outside that can be snapped into the inner receptacle of the switch panel part.

A further provision is that the inner receptacle of the switch panel part provides a localization receptacle and that a snap-in of the axle part provides a locating catch for correct snap-in positioning of the axle part with the switch panel part and for alignment with limit stops of the switch panel part and limitation of the switch positions; it is then ensured upon assemblage that the axle part and the switch panel part will assume a defined angle position from which adjustment of the switch positions is possible, which is limited by the limit stops.

A provision in another embodiment is that the axle part is likewise designed as a plastic-injection mould with the switch spindle and unlike the switch panel part, which consists of the copolymer Acrylonitrile Butadiene Styrene (ABS), is made of a polymer polyoxymethylene (POM). In doing so, optimal spring characteristics can be apportioned to the flexible shaft. Such a varied material selection also contributes to friction reduction since only these two parts carry out a rubbing movement against each other.

The connection between the rotary knob and the switch spindle is maintained simply in that at least the front section of the switch spindle that protrudes out from the switch panel part has a non-circular profile and that the rotary knob, which can be slipped-on, features a notched tab receptacle for engagement with the front section. Additionally, the hold of the rotary knob on the switch spindle can be improved in that the notched tab receptacle of the rotary knob is held on snug-fit or press-fit onto the front section of the axle part by means of a notched annular spring or the like. Irrespectively, an over-rotation safeguard can be achieved by such localization of the rotary knob on the switch spindle without spoiling the parts of the snap-in locking device, if the rotary knob is rotated further with a great amount of power when limiting the rotation of the axle part.

By more or less clearing snap-in receptacles, i.e. shifting the limit stops, the number of axle part switch positions in the switch panel part can be modified. This can be done easily by modifying the positions of the limit stops when the switch panel part is being manufactured. Modification costs for the injection moulds are also minimal. If the snap-in receptacles are separated at a distance of 30° by two connector links, then the snap-in locking devices can be produced with up to 12 switch positions. Manufacturing costs for these parts are low since they can be produced completely automatically.

One arrangement provides for aesthetic reasons that the switch panel part bears on the front side a circular cavity around the inner receptacle for receiving the rotary knob and that the axle part rests on the backside of the switch panel part. A large part of the rotary knob is sunken into the cavity, nonetheless remaining well within grasp, but does not stick out far from the switch panel. In this arrangement the rotary knob and the switch panel part cover all the function elements of the snap-in locking device.

The procedure for installing the remaining components of the operating unit according to one arrangement is to make the front section of the switch spindle, which is formed on the side of the axle part facing away from the switch panel part, coupleable with a rotatable switch part of an electric switch coordinated to the intervals of the switch positions of the snap-in locking device and mounted on the preferably non-circular section of the switch spindle and mounted rotatable in a switch part built into the switch panel, or that this section of the switch spindle that is formed on the side of the axle part facing away from the switch panel part bears an electric or electronic control unit. The control unit mounted on the flexible shaft section can be roughly placed, i.e. tolerance-sensitive.

BRIEF DESCRIPTION OF THE DRAWINGS

The invention is explained in more detail by means of an example embodiment shown in the drawing of a snap-in locking device for a control/operating unit of a household appliance. It shows.

DETAILED DESCRIPTION

Figure 1:
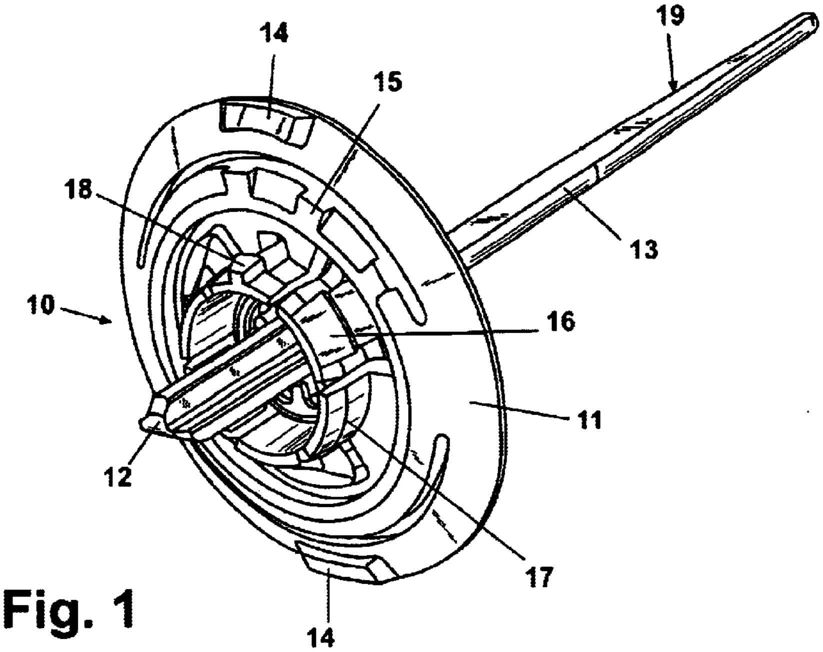
FIG. 1 in perspective view, a switch spindle with an axle part formed onto it FIG. 2 in perspective blowup, rotary knob, switch panel part and axle part with switch spindle for assembling a snap-in locking device of an operating unit.
Figure 2:
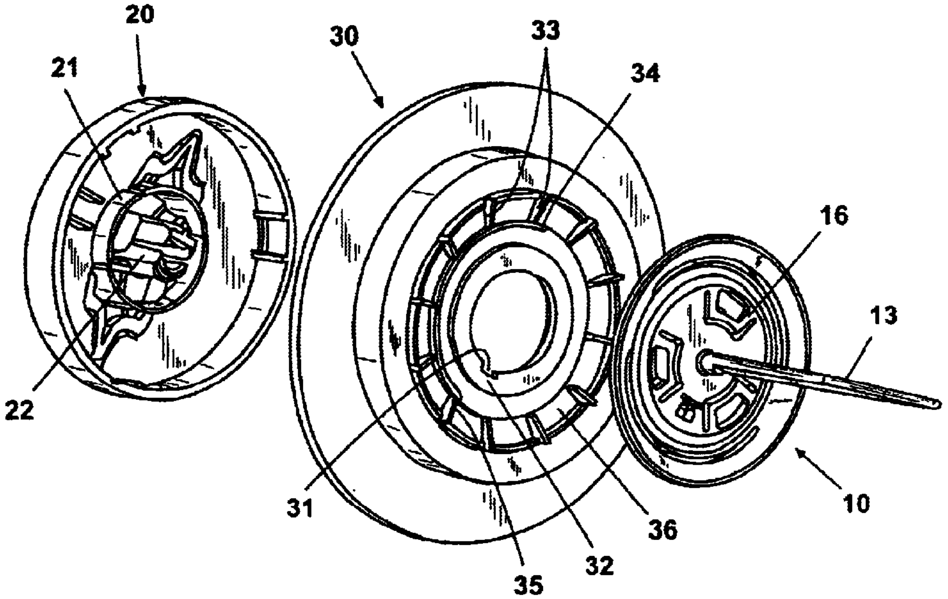
Figure 3:
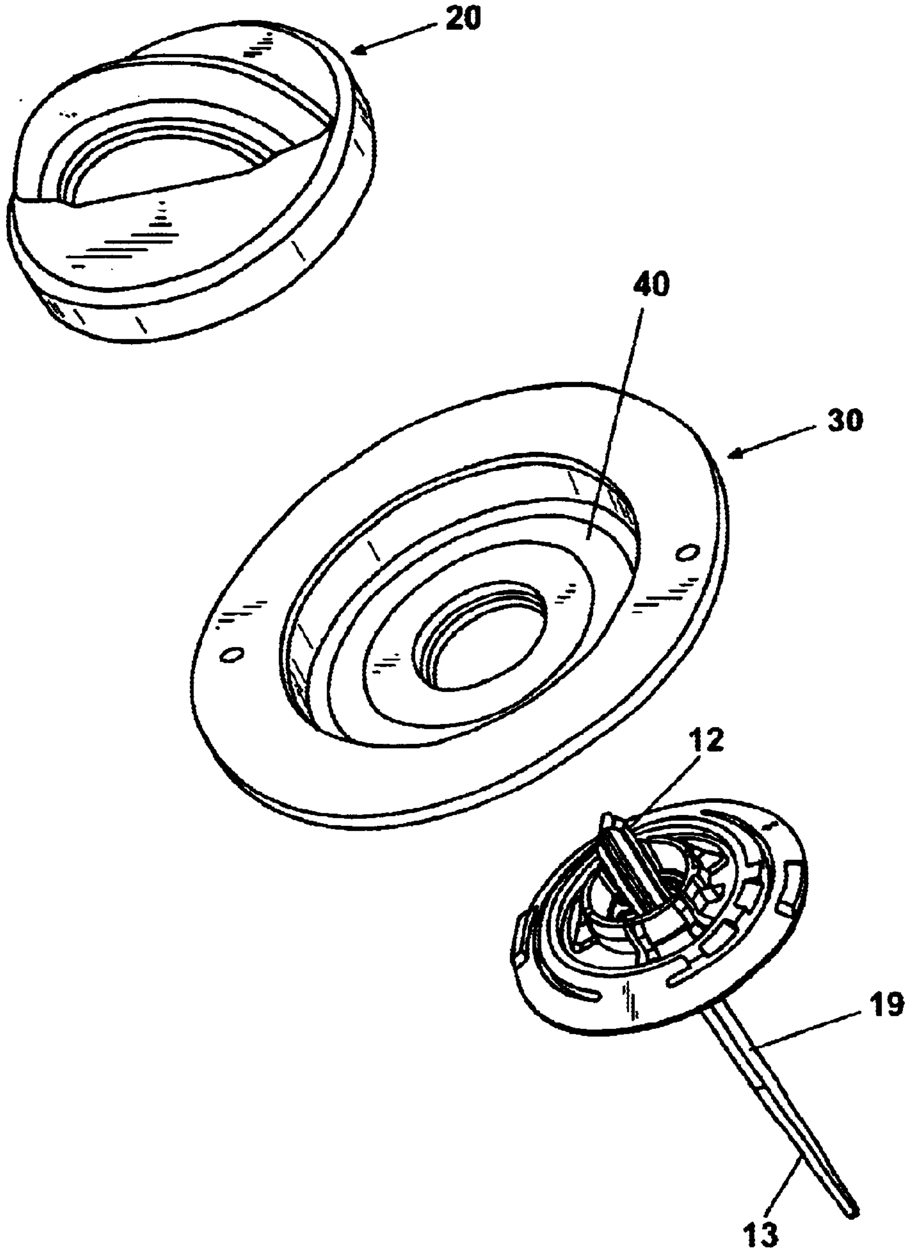
FIG. 3 in perspective blowup, rotary knob, switch panel part and axle part with switch spindle for assembling a snap-in locking device of an operating unit.

As shown in FIG. 1, an axle part 10 comprises a peripheral portion 11 and a switch spindle 19, In one embodiment, the switch spindle 19 and axle part 10 are made as a one piece injection mould, but could be made as separate attachable pieces. The switch spindle 19 can also be made as a one-piece plastic-injection mould having a front section 12 of the switch spindle 19 which sticks out on the front side of the axle part 10 and a rear section 13 on the backside of the axle part 10. Both front and rear sections 12 and 13 of the switch spindle 19 are non-circular such that a rotary knob 20 can easily be fastened to the front section 12. The same holds true for the other components, i.e. switch part or control part, of the control/operating unit on the section 13 of the switch spindle 19. Axle part 10 and switch spindle 19 are made POM as an elastic plastic-injection mould.

At the same time the rotary knob 20 is slipped and fastened on the front section 12 of the switch spindle after snapping the axle part 10 into the inner receptacle 31 of the switch panel part 30. The pass and/or snap fit can also be improved by means of a notched tab receptacle 22 that envelops a notched longitudinal side wherein the receptacle is fitted to the profile of the front section 12.

The rotary knob 20 has a collar 21 which aligns with the inner portion of the sleeve 17 of the axle part 10. As one of skill in that art should recognize, the front section 12 of the switch spindle 19 that protrudes out from the switch panel part has a non-circular profile which is configured to be slipped-on or press-fitted into the notched tab receptacle 22 on the rotary knob 20. The rotary knob 20 is arranged sunken into a circular cavity around the inner receptacle 31 of the switch panel part 30; however, it still remains easily graspable for rotation.

The axle part 10 features snap-in tabs 16 and a sleeve 17 that are insertable into the inner receptacle 31 of the switch panel part 30 and attach. The axle part 10 is snapped in from the backside into the inner receptacle 31 of the switch panel part 30.

Radially aligned connector links 33 form snap-in receptacles 36 around the inner receptacle 31 e.g. 12 links with an angular range of 30°. As shown in FIG. 1, the axle part 10 provides cams 14 as snap-in elements on the faced-in front side that are arranged within the same angular range of 30° and are beveled on the front and back edges so that they are able to slide better over the connector links 33 when the axle part 10 rotates and execute the necessary axial snap-in movements. These opposing cams cause axial misalignment. An arched connector link at the base of the connector links 33 forms limit stops 34 and 35 for a stop cam 15 of the axle part 10 that consequently prevents seizure of the snap-in receptacles 33, which are enclosed by ligaments, as switch positions. Subsequently, the number of switch positions can be defined. It is easy to understand that the number of switch positions on both the axle as well as the switch panel part can be varied easily by the connector link with the limit stops 34 and 35. This can be done easily with injection mould tools using exchangeable bits. The switch panel part 30 is preferably made as a plastic injection mould part made from ABS, on which the axle part 10 made from POM glides with little frictional resistance.

A sleeve part 17 of the axle part 10 has locating catch 18 on its outside that is inserted into a localization receptacle 32 of the inner receptacle 31 of the switch panel part 30 in order to ensure a defined angular positioning between both parts and subsequently the correct position of limit stops 34 and 35 and subsequently the section 13.

As can be seen easily, the snap-in locking device for the control/operating unit comprises just simple and cost-effective plastic-injection mould parts that can be put together without additional fastening elements and that are coupleable with the other components of the control/operating unit. Thus, two parts for the snap-in locking device and three parts for the snap-in locking device including the over-rotation safeguard are necessary.

The basic design of axle part 10 and switch panel part 30 is specified with 12 switch positions in the final design, but can be easily limited to any smaller amount.

We claim:

1. A snap-in locking device for a multistage rotary switch with a switch spindle that is connectable with a rotary knob, by means of which a switch part is adjustable into several switch positions, wherein the switch positions are determined by the pre-defined snap-in positions of the snap-in locking device, which comprises a snap-in lock element and counter-snap-in elements, wherein the switch spindle is connected with an axle part that is snapped into an inner receptacle of a built-in switch panel part, that the axle part rests on the switch panel part and is lock-in adjustable between snap-in receptacles with cams that are each limited by two radially-aligned connector links, that the snap-in receptacles extend around the entire circumference of the inner receptacle of the switch panel part, that the axle part can be set into rotary motion with the switch spindle by means of a rotary knob, which is attachable to the switch spindle, and that modifiable limit stops define the number of switch positions.

2. A snap-in locking device according to claim 1, wherein the switch spindle is designed as a one-piece plastic-injection mould part.

3. A snap-in locking device according to claim 2, wherein the axle part provides snap-in tabs that can be snapped into the inner receptacle of the switch panel part.

4. A snap-in locking device according to claim 3, wherein the inner receptacle of the switch panel part provides a localization receptacle and that a sleeve of the axle part provides a locating catch for correct snap-in positioning of the axle part with the switch panel part and for alignment with limit stops of the switch panel part and limitation of the switch positions.

5. A snap-in locking device according to claim 4, wherein the axle part is likewise designed as a plastic-injection mould with the switch spindle and unlike the switch panel part, which consists of ABS, is made of POM.

6. A snap-in locking device according to claim 5, wherein, at least the front section of the switch spindle that protrudes out from the switch panel part has a non-circular profile and that the rotary knob, which can be slipped-on, features a notched tab receptacle for engagement with the front section.

7. A snap-in locking device according to claim 6, wherein the notched tab receptacle of the rotary knob is held in snug-fit or press-fit onto the front section of the axle part by means of a notched annular spring or the like.

* * * * *